United States Patent [19]

Spooner et al.

[11] 4,340,878
[45] Jul. 20, 1982

[54] VISUAL DISPLAY APPARATUS

[75] Inventors: Archer M. Spooner, Orlando, Fla.; Paul M. Murray, Tunbridge Wells, England

[73] Assignee: Redifon Simulation Limited, Crawley, England

[21] Appl. No.: 111,285

[22] Filed: Jan. 11, 1980

[30] Foreign Application Priority Data

Jan. 11, 1979 [GB] United Kingdom ............... 7901011
Dec. 31, 1979 [GB] United Kingdom ............... 7944629

[51] Int. Cl.³ .............................................. G09G 3/02
[52] U.S. Cl. ................................. 340/27 R; 340/709; 340/712; 340/724; 358/103; 358/104; 434/44
[58] Field of Search ............ 340/712, 706, 805, 814, 340/27 R, 27 AT, 27 NA, 709, 705, 755, 724; 35/12 G, 12 N, 12 F; 358/103, 104, 88-90, 250; 356/152; 250/203 R; 455/605, 606, 609, 612; 434/38, 43, 44

[56] References Cited

U.S. PATENT DOCUMENTS

| | | | |
|---|---|---|---|
| 3,614,314 | 10/1971 | Rossire | 358/88 |
| 3,632,181 | 1/1972 | Lee | 35/12 N |
| 3,736,564 | 5/1973 | Watkins | 364/200 |
| 3,786,180 | 1/1974 | Macovski | 358/90 |
| 3,851,185 | 11/1974 | Hatsukano et al. | 340/814 |
| 3,892,051 | 7/1975 | Bunker | 434/43 |
| 4,027,403 | 6/1977 | Marsh et al. | 358/93 |
| 4,028,725 | 6/1977 | Lewis | 356/152 |
| 4,048,653 | 9/1977 | Spooner | 35/12 N |

FOREIGN PATENT DOCUMENTS 1527049 10/1978 United Kingdom ......... 340/27 NA

OTHER PUBLICATIONS

Conference: Agard Lecture Series No. 76 on Electro-Optical Systems, May 1975, pp. 4-1 to 4-13, Shepherd.

Primary Examiner—James J. Groody
Attorney, Agent, or Firm—Larson and Taylor

[57] ABSTRACT

The invention provides head-coupled area-of-interest visual display apparatus particularly for ground-based craft-flight simulators. The apparatus provides a display projected onto the inside of a part-spherical shell which surrounds the pilot and carries a retro-reflective screen. The displayed scene covers an area of interest dependent upon craft position and heading and viewer's instantaneous line of view. The image generator may be of the computer generated image, laser-scanned model or closed-circuit television type. Multiple images are required for stereoscopic viewing or for more than one viewer. Line scanning apparatus is cockpit-mounted; line image is transmitted by fibre optic light guide ribbon and frame scan apparatus is mounted on a helmet worn by the viewer. A sensor measures head/helmet movement to permit voluntary scanning of a wide angle simulated view from the craft. The projected image is divided into zones each zone using separate line-scanning means and fibre optic light guide. The frame scanning projector means provides simultaneous frame scanning of each zone.

8 Claims, 10 Drawing Figures

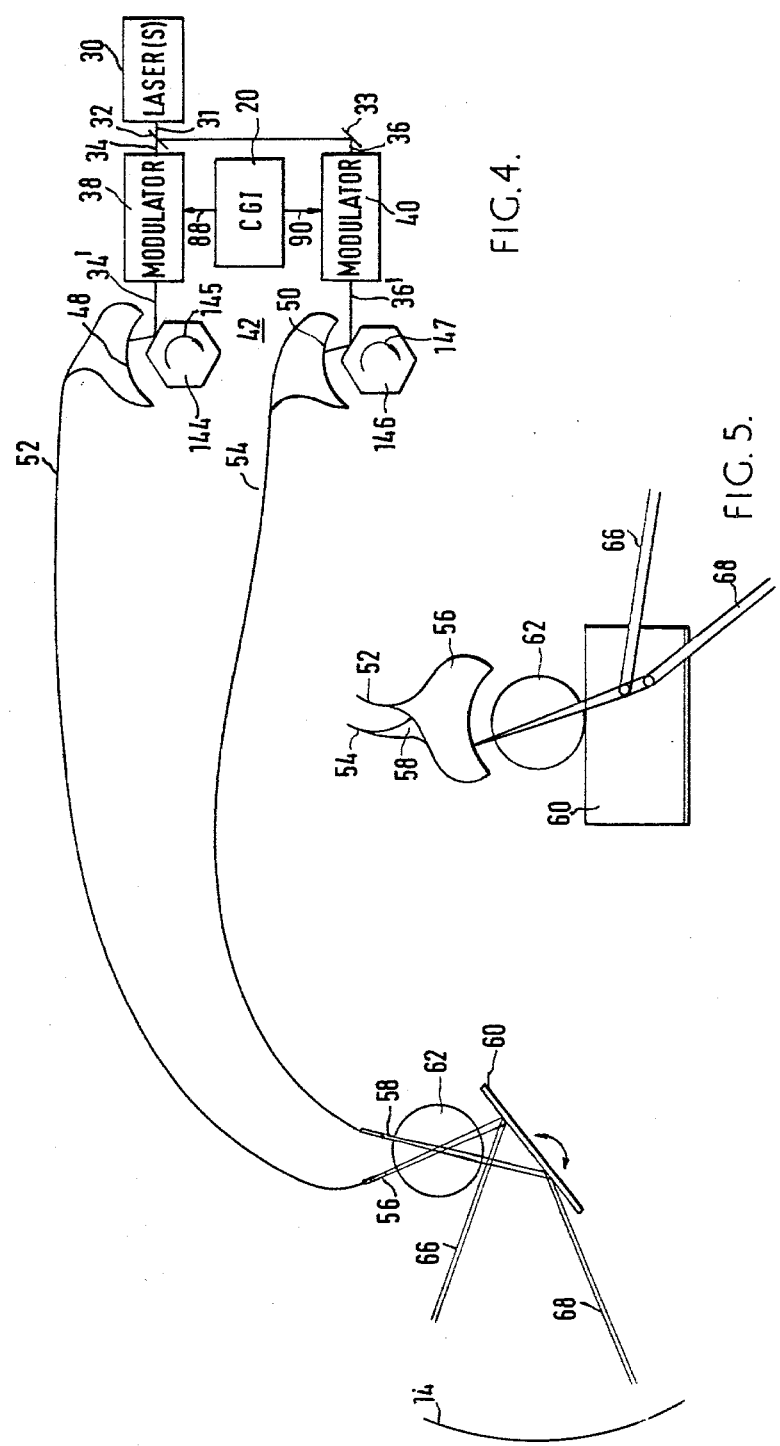

VISUAL DISPLAY APPARATUS

DESCRIPTION

This invention relates to visual display apparatus, particularly for ground-based flight simulators and particularly for providing a display covering a wide-angle field of view. The invention provides such apparatus capable of providing either pseudo-collimated or stereoscopic viewing for a sole pilot or simultaneously for two pilots.

The apparatus is of the head-coupled area-of-interest type, wherein an image is projected upon a screen and is appropriately changed both according to the simulated craft position and angular orientation and according to the viewer's instantaneous line of view and is simultaneously moved on the screen to occupy the viewer's field of view.

Apparatus of this type was described in prior U.K. Pat. No. 1,489,758. Such apparatus provided an area-of-interest display for a sole observer which was pseudo-collimated, that is, the same image was projected for left and right eyes, so as to appear at infinity.

The present invention provides image scanning and projection apparatus for a multiple-zone display, each zone having an individual line scanner, fibre optic light guide ribbon and line image transmission channel and using a helmet-mounted frame scanner.

Accordingly, the invention provides head-coupled, area-of-interest, visual display apparatus providing a displayed scene comprising two zones, including a part-spherical retro-reflective concave screen of area greater than a viewer's instantaneous field of view, a helmet, sensing means for sensing the orientation of the viewer's head and helmet, visual image generating means for generating a simulated scene in the direction of the viewer's instantaneous line of view according to the viewer's simulated position and orientation and under control of the said sensing means, the said image generating means being adapted for providing two visual images corresponding respectively to the two zones of the displayed scene, a laser light beam source, separate laser beam modulators for each zone of the displayed scene, separate line scanners for each zone of said scene for scanning the modulated laser beam over the input ends of respective fibre optic light guides, the said fibre optic light guides having their output ends at spaced-apart positions on the viewer's helmet, and frame scanning means mounted on the said helmet for receiving light from the light guide outputs and projecting the light as simultaneous scan lines of the two said zones to form the composite displayed scene on the screen.

SHORT DESCRIPTION OF DRAWINGS

In order that the invention may readily be carried into practice, one embodiment will now be described in detail, by way of example, with reference to the accompanying drawings, in which:

FIG. 4 shows diagrammatically apparatus similar to that shown in FIG. 2 for projecting a two-zone image, the two zones occupying respectively the upper and lower halves of the image;

FIG. 5 is a front view of the frame scanner of FIG. 4;

DESCRIPTION OF THE EXAMPLE

Figure 1:
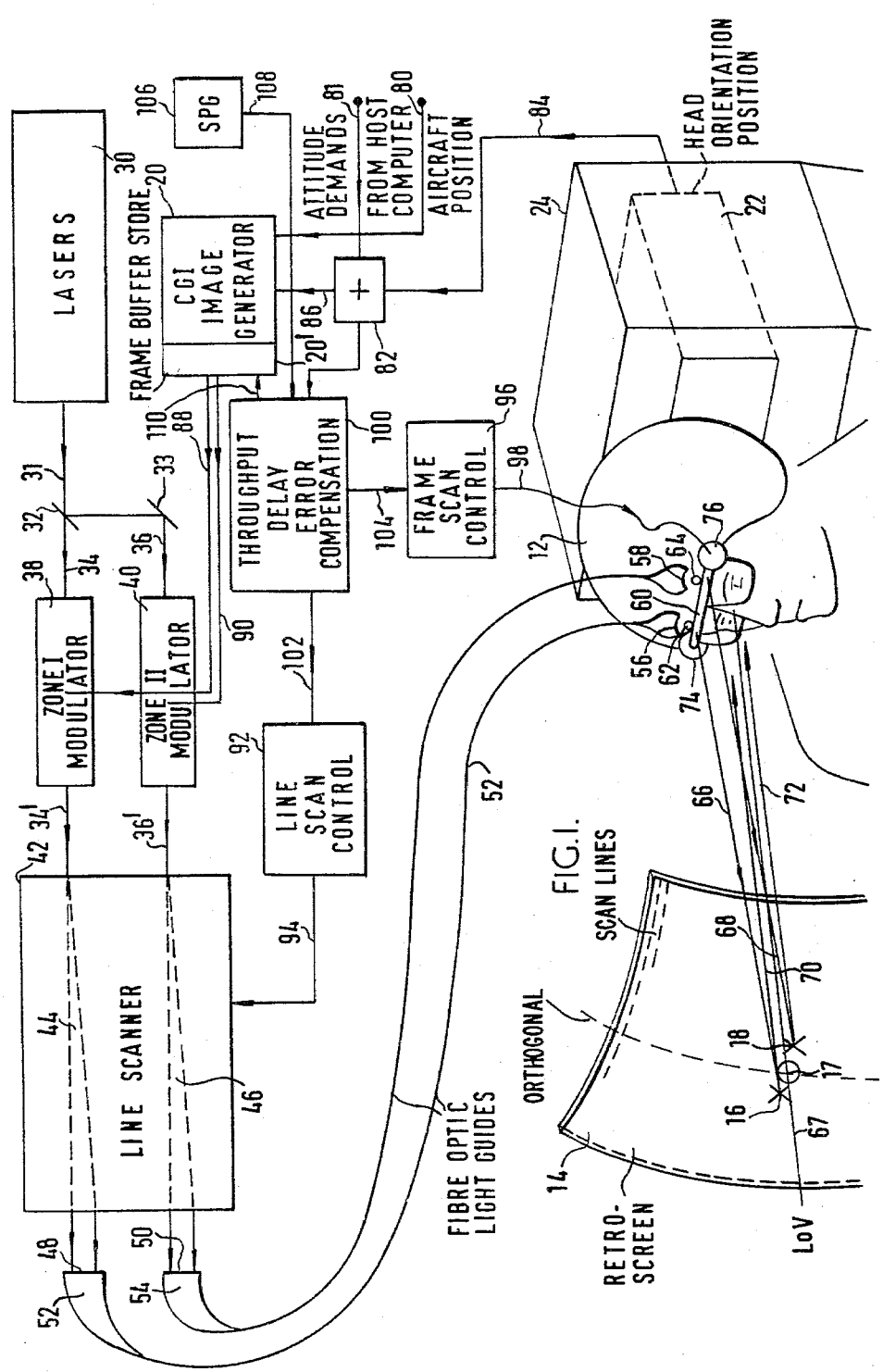
FIG. 1 is a diagrammatic perspective view showing a pilot seated in relation to a part-spherical screen for viewing a display which is projected as a multiple-zone display.

In the accompanying drawings, the same elements are indicated by the same reference numerals throughout.

FIG. 1 shows in simplified form the apparatus according to the invention for generating and displaying a two-zone area-of-interest view. A pilot 10 wearing a helmet 12 is seated within a part-spherical shell having a retro-reflective interior surface partially represented in FIG. 1 by the concave retro-reflective screen 14. The pilot's line of vision 67 intersects the screen at point 17. The field of view for each eye is centered on the point 17. The view displayed comprises two zones, each zone covering at least half of the field of view. For simplicity, the combined zones will be referred to as the displayed scene.

The displayed scene depends, in this example, upon the simulated position of an aircraft during an exercise flight, the attitude of the aircraft, the pilot's seating position in the aircraft and the pilot's instantaneous line of view as determined by the instantaneous orientation of the pilot's head and helmet. The position of point 17 on the screen 14, and hence the position of the displayed views on the screen, depends only on the pilot's head and helmet orientation.

The two zone images are generated by an image generator 20 of the computer-generated image type which includes a frame buffer memory or store 20'. The pilot's head orientation is sensed by a head orientation sensor 22, which is fixedly mounted within the simulated aircraft cockpit in a mounting 24. The displayed view is projected onto the screen 14, centered in the appropriate locations as two raster-scanned images, the line scan apparatus being cockpit-mounted and the frame scan apparatus being mounted on the helmet 12. Line scan may be either across the screen 14 or up or down. In the present example, line scan is such that the projected scan line on the screen and the line between the pilot's eyes lie in the same plane. The frame scan is orthogonal thereto. Thus, when the pilot's head is upright, line scan is horizontal and frame scan vertical.

Referring still to FIG. 1, a laser source 30 provides an output laser beam 31 which is directed through beam-splitter and reflector elements 32, 33 to provide two beams 34 and 36 of equal intensity. Laser beam 34 passes through a full-color modulator 38 controlled from the image generator 20 according to the first zone image. Laser beam 36 passes through a full-color modulator 40 controlled from the image generator 20 according to the second zone image. Both modulated beams 34' and 36' pass to a double line scanner 42 fixedly mounted in the simulated aircraft cockpit. The two scanners, described in detail later herein, provide two respective scanned beams 44 and 46 which are respectively scanned over the input ends 48 and 50 of two fibre optic light guide ribbons 52 and 54.

The two fibre optic light guides provide a flexible linkage between the fixed line scanner 42 and the movable helmet 12. In FIG. 1, the output ends of the two light guides 52 and 54 are shown spaced apart on the helmet 12 for clarity and the emergent light beams are shown separately focussed by two spherical lenses 62 and 64. In FIGS. 2 and 3, FIGS. 4 and 5 and FIGS. 6 and 7, practical arrangements of the output optics are shown according to three alternative zone dispositions. In FIG. 1, however, the emergent scanned light beams from the respective ends 56 and 58 of the light guides 52 and 54 are focussed by spherical lenses 62 and 64 onto the screen 14 and directed onto a plane mirror 60. The first zone beams are reflected by the mirror 60 along divergent paths to form a scan line of the first zone image. Similarly, the second zone beams are reflected by the mirror 60 along divergent paths to form a scan line of the second zone image. The center line of the displayed scene is thereby formed on the screen 14 at point 17.

The mirror 60 is long in relation to its width and is carried in bearings at its end which are mounted on the helmet 12. These bearings are provided by motors 74 and 76 at the two ends which move the mirror 60 to provide the required frame scan.

The mirror 60 may be a single plane mirror which is either oscillated or rotated by the motors 74, 76 on its axis parallel to the plane in which the line scan is projected or the mirror 60 may be a multi-faceted polygon mirror rod of, for example, octagonal cross-section which is continuously rotated by the motors 74, 76. In the present example, the mirror 60 is a single plane mirror and is rotationally oscillated for frame scan.

As the pilot's head moves, so does the displayed view move over the screen, so as to be in the pilot's new line of view and the view itself is changed according to the simulated real world view in the direction of the line of view.

To this end, the visual system receives data from the host flight computer on lines 80 and 81. Position data defining the simulated aircraft position throughout a simulated flight exercise is supplied to the image generator 20 on line 80. Attitude data, defining the simulated aircraft instantaneous attitude, is supplied on line 81 to a vector summing unit 82 together with head orientation data, defining the pilot's actual instantaneous line of view, on line 84. The summed output is supplied to the image generator 20 on line 86. A throughput delay error signal obtained by subtracting the head attitude input to the image generator one throughput delay period ago from the current head attitude position, is supplied to the throughput delay error control unit 100 on line 119.

The two images, respectively for the first and second zone views, in accordance with the inputted data, and allowing for the known seating position of the pilot in the simulated aircraft type, are supplied to the respective modulators 38 and 40 on lines 88 and 90.

It will be appreciated that the change of the displayed image with simulated aircraft position is relatively slow. However, the change of the displayed image with head orientation may be complete and is relatively very rapid. The image generator is unable to compute an entirely new image immediately a new line of view is established due to the throughput delay of the image generator computer. To overcome this limitation the residual old displayed view is derotated to its former screen position until the computed new displayed view is available.

The required image derotation can be effected by controlling the relationship between the video signal and the line scan and frame scan positions. This control can be produced in a number of ways.

Figure 2:
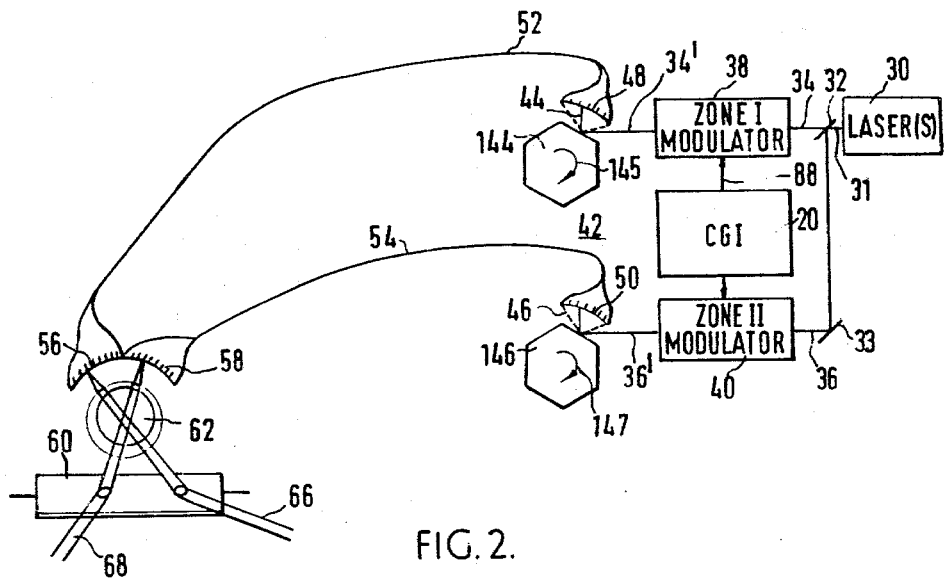
FIG. 2 shows diagrammatically the C.G.I. image generator, laser beam source, laser beam modulators, line scanners, fibre optic light guides and frame scanner for projecting a two-zone image, the two zones occupying respectively the left and right halves of the image.

The line scanner is typically a continuously rotating polygon mirror which sweeps the input laser beam or beams through an arc to produce a line scan, as in the example of FIG. 2. Three alternatives are available:

(i) If the video signal is produced at a constant rate then the line scan drive may be phase modulated to maintain the correct line in space to produce an image with the correct spatial orientation. If the line projection system is capable of transmitting only the displayed field of view, then the image size will only be that part which is common to both the computed and projected images. If the fibre optic ribbon and the projection system is capable of projecting more than the required field of view in the line scan direction then the field of view obtained may be held constant.

(ii) The video signal may be produced at a constant rate and the line scanner rotated at a constant rate. The required angular shift may then be introduced with a supplementary mirror. Line scanning apparatus, alternative to that of FIG. 2 and including such a supplementary mirror is described later herein with reference to FIG. 8.

(iii) The polygon mirror may be run at a constant angular velocity and the video signal timing adjusted by altering the time at which the video signal is read out of the frame memory or store 20' of the image generator 20. This ensures that the video signal corresponding to a point in space is produced at the predetermined time that the scanner points the light beam at that part of the screen representing the required point in space.

Of these three methods described above, method (i) involves the phase modulation of a mechanical system rotating at high speed and has the disadvantages associated with the inertia and response times of such a system. Method (ii) overcomes some of these problems by using a supplementary mirror. This mirror does not rotate at high speed but nevertheless has inertia inherent in any mechanical system and so it will have some response time. Method (iii) requires only the ability to read out a memory at controlled times. Since a memory is not a mechanical system, it has no inertia and can be read out in a discontinuous manner if required. Accordingly, method (iii) is the preferred method for line scan synchronisation in the present invention.

The frame scanner of FIG. 1 does not offer the same options as does the line scanner due to the difficulties of implementation. The alternative methods corresponding to those described for the line scanner are as follows:

(i) If the video signal is produced at a constant rate then the frame scan drive may be controlled to give the required pointing direction. In this case the frame scanner will be a position servomechanism driven by a sawtooth waveform in which the starting point of the ramp may vary in a controlled manner and the slope of the ramp may vary in a controlled manner in order to give a constant angular sweep in free space when the projector mount is being subjected to angular shifts.

(ii) The use of a supplementary mirror is impractical in the frame scanner of FIG. 1.

(iii) If the frame scanner is driven with a sawtooth of constant period, start point and slope, then the read out times from the frame store 20' may be adjusted to produce the video signal when the scanner is at the required orientation in free space.

Of these three methods, method (i) requires adjustments to the period and rate of a mechanical system which, due to its construction, has a very low inertia. Hence, the settling time following such a disturbance may be acceptable. It can preserve the instantaneous field of view constant through the throughput delay period. Method (ii) is impractical due to the physical constraints of the projection lens and frame scanner assembly of FIG. 1. Method (iii) involves adjustment to a system without inertia or the requirements of continuity. However method (iii) reduces the virtual field of view during the throughput delay period.

Continuing with the description of the apparatus of FIG. 1, a synchronising pulse generator 106 supplies pulses on line 108 to the throughput delay error control unit 100.

Line scan control signals are supplied to the line scanners of unit 42 from unit 92 by way of line 94. Frame scan control signals are supplied to the frame scan motors 74, 76 from unit 96 by way of a flexible line 98. Video synchronisation timing pulses are fed to the frame buffer 20' of the C.G.I. image generator 20, from the unit 100 on line 110. Control of the relative timings between the line scan control 92, the frame scan control 96 and the C.G.I. image generator frame buffer 20' is effected by the throughput delay error compensation circuit 100 by way of lines 102, 104 and 110, respectively.

It will be noted that the projection middle lines 66 and 68 do not coincide with the lines of view 70 and 72 for the reason that projection is effected from above the pilot's eyes. Projected onto any vertical plane, the respective lines diverge away from the screen. The angle of divergence is small but is nevertheless great enough, compared with the apex angle of the half-brilliance cone of reflection of a retro-reflective screen material, to result in a viewed scene of much reduced brilliance. It is preferred therefore to use a screen of modified retro-reflective material for which the axis of the half-brilliance cone of reflection is depressed downwardly by the angle between the projection lines 66, 68 and the line of view lines 70, 72.

The various units of the apparatus, shown in the block schematic part of FIG. 1, will now be considered in further detail in the following order:

C.G.I. Image Generator.
Laser Source.
Laser Beam Modulator.
Line Scanner.
Fibre Optic Light Guide Ribbon.
Frame Scanner.
Retro-reflective Screen.
Helmet-Head Orientation Sensor.
Throughput Delay Error Compensation Unit.
Line Scan Control.
Frame Scan Control.

C.G.I. Image Generator

The displayed scene corresponds to a real world scene as it would be visible from the simulated aircraft during flight. In earlier visual display apparatus for groundbased simulators, the visual image was generated using a scale model and a closed-circuit television camera. The camera lens, comprising an optical probe, was moved over the model correspondingly to the aircraft simulated position, altitude, heading, pitch and roll. The generated image was varied according to all these factors.

According to a more recent technique, now well established, the same form of image is computer-generated. The technique is explained in text books such as, for example, "Principles of Interactive Computer Graphics", by William M. Newman and Robert F. Sproull, published in 1973 by McGraw-Hill Book Company, New York and elsewhere.

The signals available to the image generator computer from the host flight computer of the simulator are: aircraft position, X.Y., altitude, heading, pitch and roll. C.G.I. image generators are known which generate the direct ahead view from the aircraft according to the input data, including solid-looking features with surface detail, concealing hidden edge-lines and surfaces as the aircraft flies around such objects and clipping and windowing the display according to the simulated field of view.

The image generator 20 of FIG. 1 is of this general type. Aircraft position and attitude data are supplied from the host flight computer on line 80. Aircraft heading, pitch and roll data are supplied on line 81.

However, the image generated in the apparatus of FIG. 1 is in the actual instantaneous line of view of the pilot. This view is determined also by the pilot's line of view heading and pitch and head roll relatively to the aircraft axes. Head azimuth, head pitch and head roll are determined by the head orientation sensor 22 and these data are supplied on line 84 to the summing unit 82, which adds these values to the aircraft heading, pitch and roll values respectively. The output information defining the pilot's line of view relatively to the simulated terrain overflown is supplied to the image generator 20 on line 86.

The point midway between the pilot's eyes is a constant position offset above and to the left of the aircraft longitudinal axis. This offset requires only constant values to be added to aircraft altitude and position respectively throughout an entire exercise.

For the generation of separate zone images two similar type image generators are included in the image generator 20. The same data are continuously inputted to both image generators but each includes a constant offset according to the zone positioning chosen.

Laser Source, Laser Beam Modulator, Line Scanner, Fibre Optic Light Guide Ribbon and Frame Scanner One CGI image generator, laser source, laser beam modulator, line scanner, fibre optic light guide ribbon and frame scanner elements of the apparatus required for side by side disposition of the two zones will be described together with reference to FIG. 2 and FIG. 3.

FIG. 2 shows the laser beam source 30 which provides the output laser beam 31 directed through a beam-splitter 32, 33, to provide equal intensity laser beams 34 and 36.

The laser beam 34 passes through the first zone modulator 38 and the laser beam 36 passes through the second zone modulator 40. The modulators 38 and 40 are both controlled from the CGI image generator 20, the appropriate video signals being supplied on lines 88 and 90 respectively. Corresponding modulated laser beams 34' and 36' respectively are supplied to first zone and second zone line scanners of a double line scanner shown generally at 42.

The first zone line scanner comprises a synchronously-driven polygonal section mirror drum 144 which rotates continuously in the direction shown by the arrow 145 to sweep the beam 34' over the scan path 44. One pass occurs for the movement of each mirror facet of the mirror drum 144 past the beam 34'.

A fibre optic light guide, formed into a flat ribbon 52 over most of its length, has individual groups of fibres formed into an arc at the input end 48 of the light guide. The width of the line scan 44 exactly covers the arc at 48, so that the modulated beam 34' is scanned along the arc at 48 for each line of the image.

At the output end 56 of the fibre optic light guide 52, the individual groups of fibres are similarly formed into an arc the fibre groups occurring in the same sequence at the two ends 48 and 56, so that the scanned image line at the input end 48 is exactly reproduced at the output end 56.

The emergent rays from the output end 56 of the light guide 52 are focussed by a single spherical lens 62 onto the face of the frame scanning mirror 60. As shown in FIG. 1, the mirror 60 is mounted on the pilot's helmet 12 in bearings provided by reciprocating motors 74 and 76.

With the mirror 60 stationary, the emergent rays are reflected from the mirror 60, as shown instantaneously at 66, to form a single line of one zone of the image. As the mirror 60 is moved, successive lines of the image are projected to form the entire scanned image of the first zone.

Figure 3:
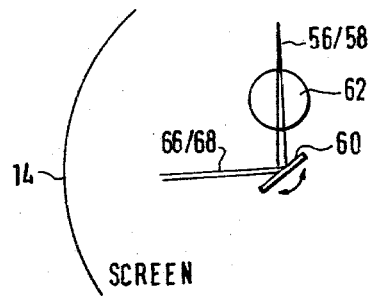
FIG. 3 is a side view of the frame scanner of FIG. 2.

FIG. 3 shows, in side view, the output end 56 of the light guide 52, the spherical lens 62, the mirror 60 and the reflected beam 66 as described above with reference to FIG. 2.

A second line scanner, for the second zone image, comprises a second mirror drum 146 which is continuously rotated in the direction of arrow 147. The mirror drum 146 scans the modulated laser beam 36' over a sector 46. One pass of the modulated beam 36' occurs for each pass of each facet of the mirror drum 146 past the incident beam path 36'.

A second fibre optic light guide 54, formed into a flat ribbon over most of its length, has its input end 50 similarly formed into an arc which exactly coincides with the curved circumference of sector 46. The output end 58 of the light guide 54 exactly reproduces the input end 50 in the sequence of fibre optic groups so that the scanned image line at the input end 50 is exactly reproduced at the output end 58.

The output ends 56 and 58 of the light guides 52 and 54 respectively are arranged side by side in a continuous arc so that, at any instant, two beams are simultaneously focussed onto the frame scanner mirror 60 by the spherical lens 62.

As shown in FIG. 2, two beams 66 and 68 are produced which simultaneously are projected to form corresponding lines of two zones of the image. The optics are arranged so that the two zones touch along a line which passes through the point 17 on the screen 14 (FIG. 1) and is vertical when the pilot's head is upright. As seen in the side view of FIG. 3, the arcuate output ends 56 and 58 are coincident, as are the reflected beams 66 and 68.

It is immaterial whether the two zones are scanned in synchronism spot for spot, as is shown in FIG. 2 but, of course, use of a common frame scanner ensures that the frame scanning of both zones is in synchronism.

FIGS. 4 and 5 show an alternative optical arrangement providing for two zones which touch along a line passing through the point 17 on the screen 14 and which is horizontal when the pilot's head is upright.

The C.G.I. image generator 20, laser beam source 30, modulators 38 and 40 and double line-scanner 42 are identical apparatus to that described with reference to FIGS. 2 and 3. The sole difference is that the video signals on lines 88 and 90 to the two modulators correspond to the vertical separation of the two zones, in this instance.

At the output ends of the light guides 52 and 54, as most clearly seen in the side view of the frame scanner, at the left hand side of FIG. 4, the arcuate output ends 56 and 58 are arranged centrally of the frame scan mirror 60, the output end 58 lying behind the output end 56. In consequence, the beam 66 is reflected from the mirror 60 to the upper half of the displayed view and beam 68 is reflected to the lower half.

FIG. 5 shows the front view of the output optics and common frame scanner. The optics are arranged so that the upper and lower zones touch along the line containing the point 17, FIG. 1, and lying in the same plane as the line between the pilot's two eyes.

Figures 6, 7:
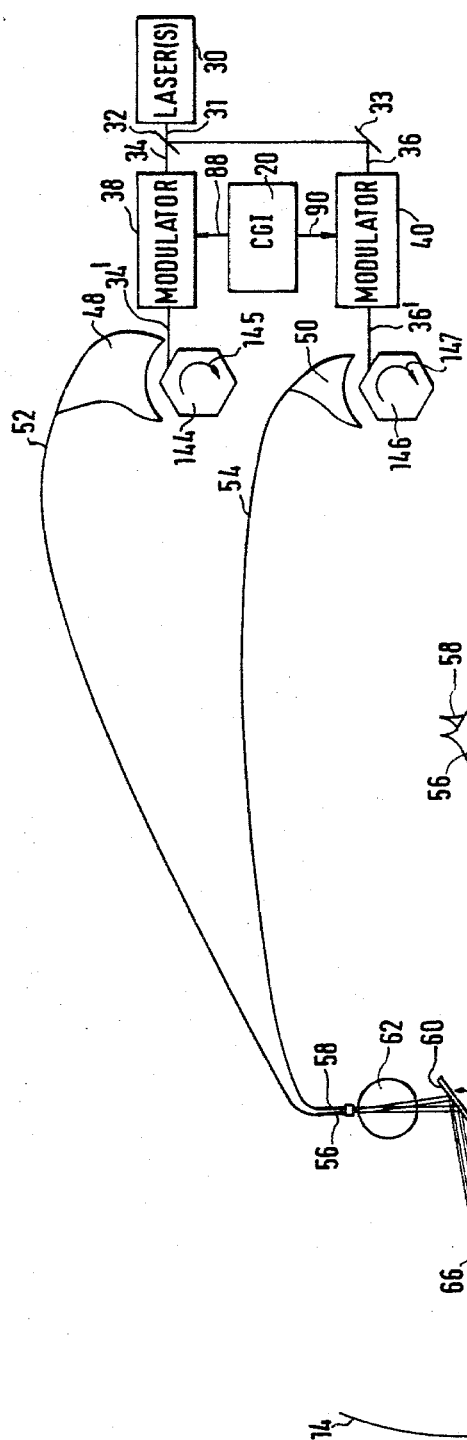
FIG. 6 shows diagrammatically apparatus similar to that shown in FIG. 2 and FIG. 4 for projecting a two-zone image, the two zones representing adjacent scan lines of an interlaced image.
FIG. 7 is front view of the frame scanner of FIG. 6.

FIGS. 6 and 7 show a further alternative optical arrangement providing for two zones each covering the area of the displayed view but comprising alternate scan lines of an interlaced scanned raster display.

Again the image generator 20, laser beam source 30, modulators 38 and 40 and double line-scanner 42 are identical apparatus to that shown in FIGS. 2 and 3 and in FIGS. 4 and 5. In this case, the different video signals on lines 88 and 90, to the two modulators 38 and 40 represent the image content of alternate scan lines of the display.

At the output ends of the light guides 52 and 54, as most clearly seen in the side view of the frame scanner, at the left hand side of FIG. 6, the arcuate output ends 56 and 58 of the two light guides are arranged centrally of the frame scan mirror 60, the output end 58 being immediately behind the output end 56.

The beam 66 is reflected from the mirror 60 above the beam 68 but, at the screen 14, the separation of the resultant scan lines is very much less than in FIGS. 4 and 5, the beam 66 corresponding to the scan line immediately above the scan line to which the beam 68 corresponds.

FIG. 7 shows the front view of the output optic and common frame scanner.

Three alternative forms of projected display are possible, according to the present invention.

According to the first alternative, the displayed scene comprises two zones but, being projected from a single source, the displayed scene has the disadvantage that it appears to the viewer to be at the distance of the screen 14.

According to this embodiment, the arrangement of fibre optic light guide output ends and lens and frame scanner means shown in FIGS. 2 and 3, or in FIGS. 4 and 5, or in FIGS. 6 and 7 are placed on the helmet 12 above the line joining the pilot's eyes and centrally of that line. The frame scanning mirror 60 is positioned as close above the line joining the eyes as is practically possible.

According to the second and preferred alternative, the displayed scene comprises two zones and identical images are projected onto the screen from fibre optic light guide output ends and focussing lens means positioned on the helmet 12 above each eye of the viewer. In this way, a pseudo-collimated displayed scene, appearing to be at infinity instead of at the distance of screen 14, is presented to the viewer.

Figure 9A:
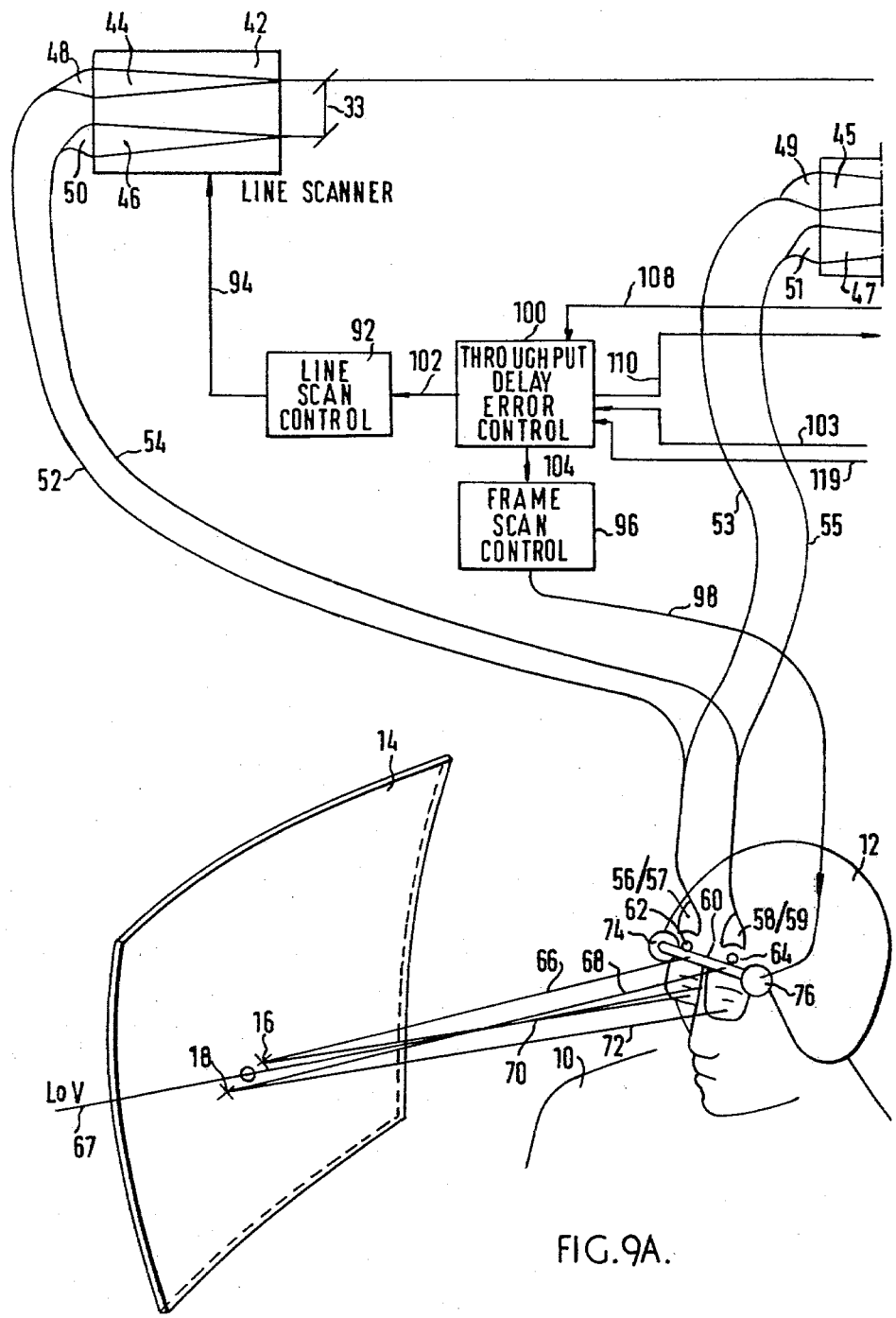
FIG. 9 (comprised of FIGS. 9A and 9B) is a diagrammatic perspective view showing apparatus for a preferred form of the invention providing a two-zone pseudo-collimated display.
Figure 9B:
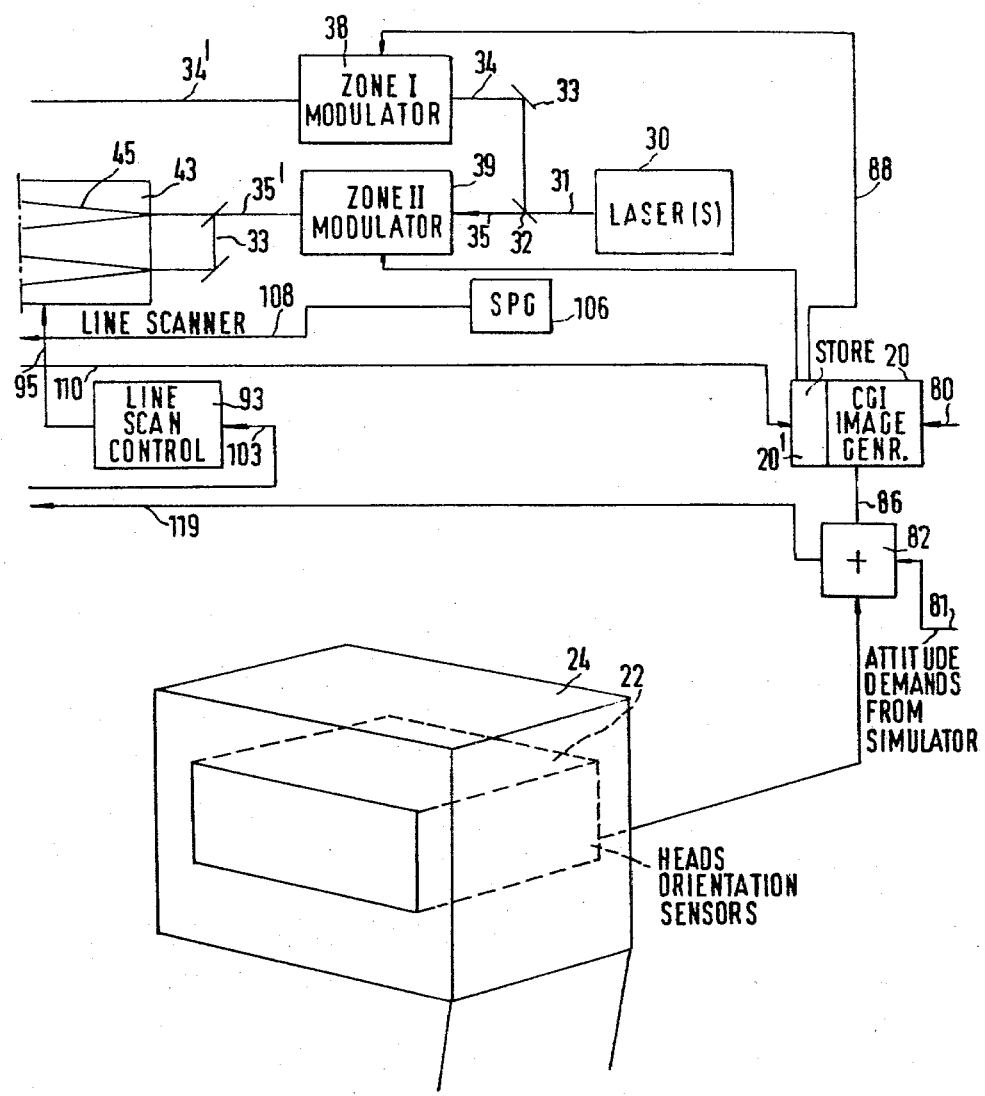

This arrangement corresponds to the arrangement illustrated in FIG. 1 in using two lenses 62 and 64, one positioned above each eye, focussing the respective fibre optic guide output ends onto the screen 14 and directing the output light onto the common frame scanning mirror 60. This alternative form of the invention is illustrated in FIG. 9, which is more fully described later herein.

This alternative requires an output arrangement, according to any one of FIGS. 2, 3, FIGS. 4, 5 or FIGS. 6, 7, including a pair of light guides to be mounted on the helmet 12 above each eye, to use lenses 62 and 64 respectively. This arrangement doubles the number of fibre optic light guides used. At the input ends of the light guides, the two zone modulators 38 and 40 and the line scanner 42 are duplicated. One line scanner serves for the two light guides which terminate above each respective eye. Both first zone modulators are supplied with the same video modulation signals as each other. Similarly, both second zone modulators are supplied with the same signals as each other.

This alternative makes use of a screen with a modified reflective characteristic, as described herein.

According to the third alternative, different images are projected for each eye of the viewer, the two images forming a stereoscopic pair.

A pair of fibre optic light guides terminate above each eye with focussing lens means as shown in FIGS. 2, 3 or FIGS. 4, 5 or FIGS. 6, 7, using the common frame scanning mirror 60.

The optical arrangements at the output ends of the light guides is the same as for the second alternative described. Similarly, the two zone modulators and line scanners at the input end are duplicated.

However, for this alternative, the C.G.I. image generator 20 and frame buffer store 20' are duplicated the two image generators respectively generating the two zones of the two images of a stereoscopic pair. The respective first zone and second zone image video signals of each image of the stereoscopic pair are supplied to the right-eye and left-eye pair of zone modulators, respectively.

Figure 8:
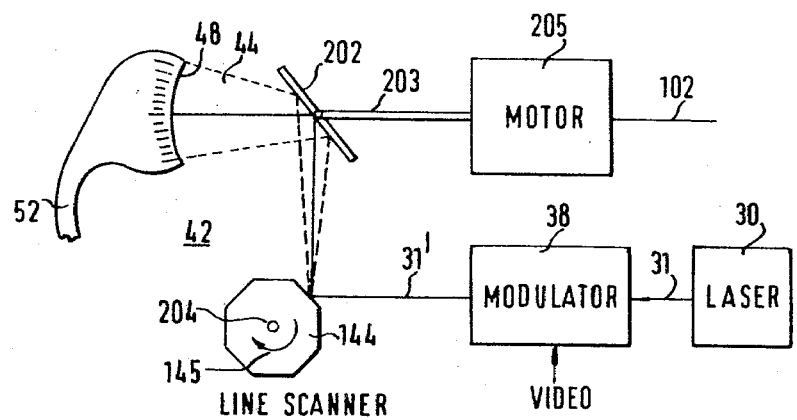
FIG. 8 is a detail view showing an alternative line scanner.

FIG. 8 shows line scanning apparatus alternative to that of FIG. 2 and including a supplementary mirror 202. The mirror 202 is pivotable on an axis 203 which is parallel to the spin axis 204 of the polygon mirror line scanner 144.

To effect image derotation for head movement in the direction of line scan by the method (ii) described earlier, the mirror 202 is rotationally positioned about its axis 203 by a motor 205 in a controlled manner so that the swept arc 44 is positioned at the required part of the arc 48 at the input end of the fibre optic light guide 52. The motor 205 is controlled from the throughput delay error control unit 100 by a signal on line 102.

Referring to FIG. 9, which illustrates the second alternative form of the invention providing the pilot with a pseudo-collimated display in two zones, it will be noted that the apparatus is generally similar to that of FIG. 1, except that two projectors are used, one above each eye of the pilot. Thus, two projectors use respectively lenses 62 and 64 to project the line image of a pair of fibre optic light guide output ends onto the screen 14 by way of the common frame scanning mirror 60.

The respective pairs of light guide ends 56, 57 and 58, 59 may be relatively disposed as shown in FIGS. 2, 3, FIGS. 4, 5 or FIGS. 6, 7, according to the relative disposition required for the two zones. In FIG. 9, they are shown forming one continuous arc, as shown in FIGS. 2, 3.

The respective ends 56, 57 and 58, 59 terminate the light guide pairs 52, 53 and 54, 55 the respective input ends 48, 49 and 50, 51 are scanned one by the first zone line scanner 42 and the other one by the second zone line scanner 43.

The line scanner 42 scans the modulated laser beam 34' over the two light guide input ends 48 and 50. The line scanner 43 scans the modulated laser beam 35' over the two light guide input ends 49 and 51.

The respective first zone and second zone laser beam modulators 38 and 39 both receive their video modulation signals from the store 20' of the C.G.I. image generator 20, under control of the pulses supplied by the throughput delay error control unit 100 on line 110.

Modified Retro-Reflective Screen

Retro-reflective projection screen material such as that sold under the name SCOTCHLITE (Registered Trade Mark) has a reflection characteristic such that light incident upon the screen is reflected back along the line of incidence. That is to say, reflected light is brightest on the line of incidence, falling in intensity rapidly as the eye is displaced from the line of incidence in any direction. With one retro-reflective material, observed brightness falls to one-half intensity at an angle of 0.8° displacement from the line of incidence. Stated in other words, the area of half-brightness is the base area of a cone which has its axis on the line of incidence and having a half-angle of 0.8° at its apex.

In the projection apparatus described with reference to FIG. 1, the line of incidence 66, between the frame scanner 60 and the screen 14, makes an angle which is also approximately 0.8° with the line of view 67, between the screen 14 and the eye of pilot 10. Thus, with an unmodified retro-reflective screen, the projected image would be seen at half-brightness by the pilot.

In the apparatus of the invention, it is preferred to modify the reflection characteristic of the screen in order to increase the brightness of the projected image on the pilot's line of view, while decreasing brightness elsewhere. This modification is effected by placing a diffraction grating in front of the screen surface.

Head/Helmet Orientation Sensor

Mechanical linkages have been proposed to sense the orientation of a pilot's helmet relatively to an aircraft cockpit. However, mechanical arrangements of any sort are undesirable in the environment of an aircraft simulator cockpit.

It is preferred to effect helmet orientation sensing by non-contact means. Any suitable known head/helmet orientation sensor may be used in apparatus of the present invention to provide electrical signals defining instantaneous helmet orientation. One such sensor is that described by R. G. Stoutmeyer and others in U.S. Pat. No. 3,917,412, entitled "Advanced Helmet Tracker Using Lateral Photodetection and Light-Emitting Diodes". Such apparatus is further described by Edgar B. Lewis in U.S. Pat. No. 4,028,725, entitled "High-Resolution Vision System".

Throughput Delay Error Compensation Unit, Line Scan Control and Frame Scan Control As has been explained earlier in the description, the C.G.I. image generator 20 takes an appreciable time to compute a new view for display when the pilot's line of view is changed. The delay is of the order of 100 m secs. However, when any viewer changes his line of view, by extensive head movement, there is a delay before the viewer appreciates the new view before him. This delay also is of the same order of time as the image generator delay.

In a simplified form of the apparatus according to the invention means are provided merely to ensure that the old display is not projected in the new line of view of the changed head position.

In this simplified form of the apparatus, a large change of head orientation signal on line 119 is effective to blank out the projected view for a period of some 100 m secs. until the new view has been computed.

The apparatus of FIG. 1 provides means for the derotation of the projected image upon rotation of the pilot's head. Derotation is considered to be of especial importance when head movement is such that the new field of view is not separate from the old field of view but is within it or overlaps it.

The displayed view is some 100° in azimuth and some 70° in elevation, with respect to the pilot's line of view. Although a viewer's field of view may exceed these angles, the marginal areas are low-interest and the central area of prime-interest may be a cone of perhaps only 5° about the line of vision. It is therefore readily possible for the pilot to change his line of view so as to move this area of central interest within the initial displayed view area.

In the apparatus of FIG. 1, line scan is in a direction across the screen 14 and frame scan is orthogonal thereto. The head orientation sensor 22 provides signals resolved into head azimuth movement and head pitch movement.

The sychronizing pulse generator 106 provides a line synchronizing and frame synchronizing pulse output of equally spaced apart pulses. Upon change of head azimuth, the output signal on line 119 causes the throughput delay error control unit 100 to provide a relative change of phase of the line synchronizing pulses supplied by control unit 92 to the line scanner 42, and the video synchronizing pulses supplied on line 110 by the throughput delay error control unit 100 to the frame buffer store 20', so controlling read out from the store 20' in the sense to displace the displayed image equally and oppositely to every change of head azimuth.

Similarly, the output signal on line 119 causes control unit 100 together with frame scan control unit 96 to provide a relative change of phase of the frame synchronising pulses supplied by control unit 96 to the frame scanning motors 74 and 76.

Thereby, upon head rotation in azimuth or pitch or both, the displayed view is displaced oppositely. The derotation is maintained for a period of some 100 m secs., until the new view is computed. The original relative timing of the synchronizing pulses is then restored, so that the new view is displayed in the direction of the new line of view.

We claim:

1. Head-coupled, area-of-interest, visual display apparatus providing a displayed scene comprising two zones, including a part-spherical retro-reflective concave screen of area greater than a viewer's instantaneous field of view, a helmet, sensing means for sensing the orientation of the viewer's head and helmet, visual image generating means for generating a simulated scene in the direction of the viewer's instantaneous line of view according to the viewer's simulated position and orientation and under control of the said sensing means, the said image generating means being adapted for providing two visual images corresponding respectively to the two zones of the displayed scene, a laser beam source for producing a laser beam, separate laser beam modulators for each zone of the displayed scene for modulating said laser beam, separate line scanners for each zone of said scene for scanning the modulated laser beam over the input ends of respective fibre optic light guides, the said fibre optic light guides having their output ends at spaced-apart positions on the viewer's helmet, and frame scanning means mounted on the said helmet for receiving light from the light guide outputs and projecting the light as simultaneous scan lines of the two said zones to form the composite displayed scene on the screen.

2. Head-coupled, area-of-interest, visual display apparatus as claimed in claim 1, in which the said two zones have a common boundary passing through the point on the said screen at which the viewer's instantaneous line of view intersects the screen surface and parallel to the direction of line scan upon the screen.

3. Head-coupled, area-of-interest, visual display apparatus as claimed in claim 1, in which the said two zones have a common boundary passing through the point on the said screen at which the viewer's instantaneous line of view intersects the screen surface and orthogonal to the direction of line scan upon the screen.

4. Head-coupled, area-of-interest, visual display apparatus as claimed in claim 1, in which the said two zones cover substantially the same area upon the screen and together form an interlaced, scanned image upon the screen successive scanned lines of the two zone images comprising alternate lines of the said interlaced, scanned image.

5. Apparatus as claimed in claim 2, in which the respective fibre optic light guides each have their fibres fanned into a concave arc at the input end at which the fibres are scanned by a polygon mirror line scanner and the fibre optic light guides similarly each have their fibres, in the same sequence, fanned into a concave arc at the output end, the output ends lying one behind the other in parallel spaced relationship with respect to common focussing lens and mirror frame scanner means.

6. Apparatus as claimed in claim 3, in which the respective fibre optic light guides each have their fibres fanned into a concave arc at the input end at which the fibres are scanned by a polygon mirror line scanner and the fibre optic light guides similarly each have their fibres, in the same sequence, fanned into a concave arc at the output end, the output ends lying one adjacent the other in a continuous arc with respect to common focussing lens and mirror frame scanner means.

7. Apparatus as claimed in claim 4, in which the respective fibre optic light guides each have their fibres fanned into a concave arc at the input end at which the fibres are scanned by a polygon mirror line scanner and the fibre optic light guides similarly each have their fibres, in the same sequence, fanned into a concave arc at the output end, the output ends lying adjacent the one with respect to the other, so that, with respect to common focussing lens and frame scanner means, the respective light guides provide alternate lines of an interlaced scanned image upon the said screen.

8. Apparatus as claimed in claim 5, in which the input ends of the fibre optic light guides are respectively scanned by the line scanning mirror indirectly by way of a supplementary mirror which is movable to select the portion of the arc of fibres so scanned.

* * * * *